(12) United States Patent
Ferber et al.

(10) Patent No.: US 8,441,891 B2
(45) Date of Patent: May 14, 2013

(54) SEISMIC DATA ACQUISITION AND PROCESSING QUALITY CONTROL

(75) Inventors: Ralf Ferber, Horsham (GB); Franz Kirchheimer, Burgwedel (DE); Andreas Laake, Kingston (GB)

(73) Assignee: WesternGeco L.L.C., Houston, TX (US)

( * ) Notice: Subject to any disclaimer, the term of this patent is extended or adjusted under 35 U.S.C. 154(b) by 596 days.

(21) Appl. No.: 12/649,869

(22) Filed: Dec. 30, 2009

(65) Prior Publication Data
US 2011/0158046 A1   Jun. 30, 2011

(51) Int. Cl.
*G01V 1/00*   (2006.01)

(52) U.S. Cl.
USPC ............................ 367/49; 367/38

(58) Field of Classification Search ............ 367/32, 367/36, 39, 43, 49, 73
See application file for complete search history.

(56) References Cited

U.S. PATENT DOCUMENTS

| | | | | |
|---|---|---|---|---|
| 5,144,590 A | * | 9/1992 | Chon | 367/57 |
| 5,491,669 A | * | 2/1996 | Chambers | 367/49 |
| 5,671,136 A | * | 9/1997 | Willhoit, Jr. | 702/18 |
| 5,771,203 A | * | 6/1998 | Soubaras | 367/46 |
| 5,774,417 A | * | 6/1998 | Corrigan et al. | 367/24 |
| 6,772,068 B2 | * | 8/2004 | Laake | 702/14 |
| 8,139,440 B2 | * | 3/2012 | Ferber et al. | 367/38 |
| 2003/0200030 A1 | * | 10/2003 | Meldahl et al. | 702/14 |
| 2008/0294393 A1 | * | 11/2008 | Laake et al. | 703/1 |
| 2010/0292973 A1 | * | 11/2010 | Barnes et al. | 703/6 |

OTHER PUBLICATIONS

Cambois, et al., Surface-Consistent Deconvolution in the Log/Fourier Domain, Geophysics, Jun. 1992, pp. 823-840, vol. 57, No. 6.
Kirchheimer, et al., Robust Surface Consistent Deconvolution with Noise Suppression, SEG 2001.

\* cited by examiner

*Primary Examiner* — Isam Alsomiri
*Assistant Examiner* — Krystine Breier

(57) ABSTRACT

The present invention relates to producing a quality control measure for use during data acquisition and/or data processing of, preferably, seismic data. While or after obtaining the data, a surface consistent decomposition of the data is performed. From the surface consistent decomposition, one may compute a decomposed logarithmic spectra, and from the decomposed logarithmic spectra, one may compute one or more residua. An error attribute based on the one or more residua can be formulated, analyzed, and output. The error attribute can be used as a quality control measure or the analysis result can be used to produce a quality control measure.

28 Claims, 2 Drawing Sheets

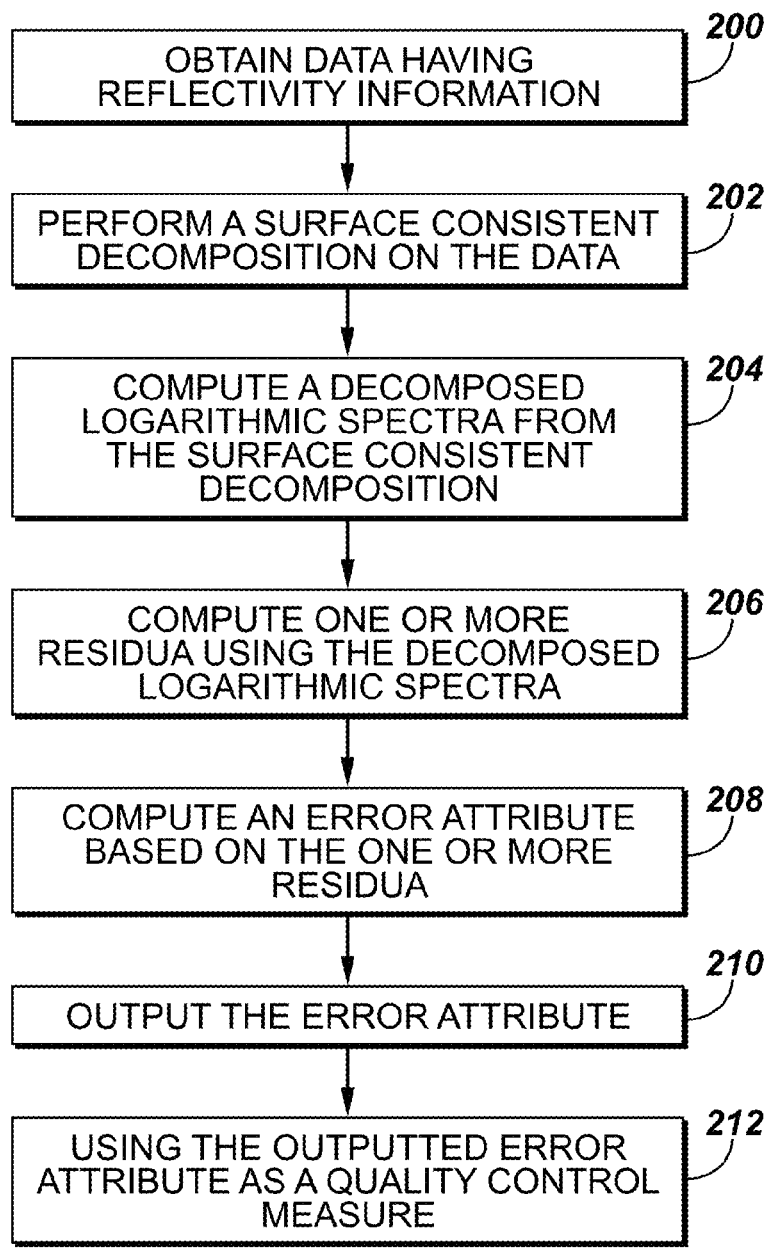

SEISMIC DATA ACQUISITION AND PROCESSING QUALITY CONTROL

CROSS-REFERENCE TO OTHER APPLICATIONS

Not applicable.

BACKGROUND OF INVENTION

1. Field of the Invention

The present application relates generally to the field of seismic data acquisition and processing, and particularly to using surface consistent decomposition for seismic data acquisition and processing quality control.

2. Background

Geophysical prospecting has been used extensively in the search for underground resources such as oil, gas, and minerals. Common techniques used for exploration include seismic, gravity, magnetic, and electrical methods. Seismic is historically the most widely used and can be subcategorized into seismic reflection and seismic refraction methods. With the seismic reflection method, the structure of subsurface formations is mapped by measuring the times required for a seismic wave, generated in the earth by a near-surface explosion, mechanical impact, vibration, or air gun, for example, to return to the surface after reflection from interfaces between formations having different physical properties. The reflections are recorded by detecting instruments responsive to ground motion or pressure waves. With reflection methods, one can locate and map, for example, such features as anticlines, faults, salt domes, and reefs.

The recorded data generally are processed using computers prior to being interpreted. The basic objective of seismic processing is to convert the information recorded in the field into a form that best facilitates geological interpretation. The field data are transformed into corrected record sections. One object of the processing is to eliminate or reduce noise. Another is to present the reflections with the greatest possible resolution.

Digital filtering is one commonly used processing method. One type of digital filtering is known as deconvolution. Because the reflected signal is effectively filtered or convolved by the earth as it passes from the source to the receiver, an inverse filter is produced that ideally cancels the effect of the earth's filtering. That is, the deconvolution operation converts the waveform of a reflection modified by the filtering of the earth into a simple pulse representing the reflection waveform before the filtering took place.

Seismic reflection data have historically been deconvolved using single-channel spiking deconvolution. That technique, however, is based on the false assumption that the reflectivity series are "white". That is, the deconvolution filter is designed to produce a reflection signal that is a spike, meaning all frequency components of the reflection signal's frequency spectrum have equal amplitudes. A spike would provide the highest resolution possible. However, absorption of higher frequencies by the earth broadens the source signal so that it is no longer white. Single-channel spiking deconvolution is also sensitive to random noise because any deconvolution program that raises the high frequency response could magnify existing noise in the record.

Surface consistent deconvolution is a multichannel deconvolution using a geometric mean and gathers of common shots, common receivers, common midpoints, and common offsets. This process provides a deconvolution operator for every shot and receiver gather, corresponding respectively to the source function and the receiver impulse response, as well as an estimate of the reflectivity functions at every common midpoint (CMP) location.

SUMMARY

The present invention relates to producing a quality control measure for use during data acquisition and/or data processing of, preferably, seismic data. While or after obtaining the data, a surface consistent decomposition of the data is performed. From the surface consistent decomposition, one may compute a decomposed logarithmic spectra, and from the decomposed logarithmic spectra, one may compute one or more residua. An error attribute based on the one or more residua can be formulated, analyzed, and output. The error attribute can be used as a quality control measure or the analysis result can be used to produce a quality control measure.

BRIEF DESCRIPTION OF THE FIGURES

FIG. 2 is a flowchart showing the steps in one embodiment described in the present disclosure.

Figure 1A:
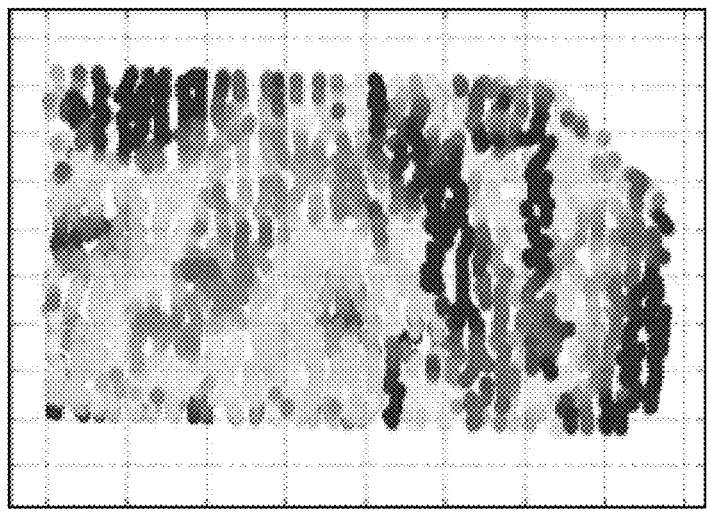
FIG. 1A is a scatter plot of an error attribute based on the source signal strength in accordance with the present disclosure.

It is to be understood that the drawings are to be used for the purpose of illustration only, and not as a definition of the metes and bounds of the invention, the scope of which is to be determined only by the scope of the appended claims.

DETAILED DESCRIPTION

Specific embodiments of the invention will now be described with reference to the figures. Like elements in the various figures will be referenced with like numbers for consistency. In the following description, numerous details are set forth to provide an understanding of the present invention. However, it will be understood by those skilled in the art that the present invention may be practiced without many of these details and that numerous variations or modifications from the described embodiments are possible.

A seismic trace $P_{ij}(t)$ created by a shot number i and recorded at receiver j can be written as:

$$P_{ij}(t)=S_i(t)*R_j(t)*\Gamma_{ij}(t), \quad (1a)$$

where the * represents convolution in the time domain. S is a source function, R is the receiver impulse response, and $\Gamma$ is the Green's function. The goal of deconvolution is to remove the effects of the wavelet $W_{ij}=S_i*R_j(t)$ from this seismic trace.

For more convenient notation, the data can be sorted by common midpoint (CMP) and offset. If k is the CMP number (k=i+j when shot spacing is equal to receiver spacing) and p is the offset index (p=i+j), we have:

$$P_{ij}(t)=S_i(t)*R_j(t)*\Gamma_{kp}(t). \quad (1b)$$

Assuming CMP gathering is valid, meaning all traces gathered at a particular CMP location contain essentially the same subsurface information, this information represents the normal incidence reflectivity. If Q represents a processing sequence that approximately transforms each trace into its corresponding normal incidence reflectivity, then $$Q(\Gamma_{kp}(t)) \approx Y_k(t), \quad (2)$$

where $Y_k(t)$ is the normal incidence reflectivity at CMP position k. We now have $$Q(P_{ij}(t))=S_i(t)*R_j(t)*Y_k(t). \quad (3)$$

An additional term, $H_p(t)$, representing an offset dependent operator may be included in equation (3) to yield:

$$Q(P_{ij}(t))=S_i(t)*R_j(t)*Y_k(t)*H_p(t) \quad (4)$$

The offset operator is introduced to account for the nonlinearity of Q and its approximated estimation. The offset operator helps make the source and receiver operators in equation (4) physically reasonable, despite the nonlinearity of the CMP processing.

Estimating the source, receiver, offset, and CMP terms ($S_i$, $R_j$, $H_p$, $Y_k$) from the seismic data using equation (4) is known as "surface consistent decomposition", and removing the source, receiver, and offset operators from the data is called "surface consistent deconvolution". The goal of surface consistent deconvolution is to exploit data redundancy to obtain more robust statistical estimates of the wavelets.

Equation (4) can be further modified to include a global response term, g, which represents a geometrically averaged amplitude spectrum for all traces (seismograms):

$$Q(P_{ij}(t))=S_i(t)*R_j(t)*Y_k(t)*H_p(t)*g. \quad (5)$$

This time domain function can be transformed into the frequency domain using the Fourier transform. Transforming to the frequency domain converts the convolution operators to multiplication operators, as is well known in the art. Surface consistent deconvolution assumes the power spectrum of the trace can be decomposed as the product of the spectra of component wavelets. This may be represented as:

$$P(\text{trace})=P(src) \times P(rcv) \times P(cmp) \times P(\text{offset}) \times Pg. \quad (6)$$

Assuming all factors are positive and taking the logarithm of both sides of Equation (6) converts the product to a sum:

$$L(\text{trace})=L(src)+L(rcv)+L(cmp)+L(\text{offset})+Lg. \quad (7)$$

Thus, the equation reduces to a linear problem for the logarithmic power spectra.

The decomposed logarithmic spectra used in the surface consistent spectral analysis can be used to create a quality control measure. Because in practice the right-hand side of Equation (7) will not in fact always equal the left-hand side, there are residua given by:

$$R(s,r,c,o)=L(src)+L(rcv)+L(cmp)+L(\text{offset})+Lg-L(\text{trace}). \quad (8)$$

An error attribute can be defined based on those residua. For example, the RMS (root-mean-square) of all residua for a common source could be used. Similarly, the RMS of all residua for the other terms could be used. Other quantities or desired statistics computed from the residua could also be used to define the error attribute.

One method used to solve the linear system of Equation (7) is an $L_1/L_2$ decomposition method. (See Kirchheimer, F., Ferber R., 2001: Robust Surface Consistent Deconvolution With Noise Suppression, 71st Ann. Meeting, SEG, San Antonio, Tex.) This method is robust and relatively immune from the effects of outliers produced by inconsistent noise. Because the $L_1/L_2$ decomposition is largely unaffected by those outliers, they are visible in the residua and the error attribute can be a measure of the overall fit of the surface consistent model to those traces arising, say, from a common source. If the residua for other terms are used, the error attributes would similarly measure the overall fit to those traces sharing that common parameter.

The error attributes are preferably written to the deconvolution database and thus can be retrieved, analyzed, and extracted exactly as the regular (spectral) attributes by a special processing module. By analyzing and extracting features from the decomposed logarithmic amplitude spectra created by the surface consistent deconvolution process, one may obtain scatter maps of the source, detector, etc. stations, color coded by the feature in question. By including the error attributes and the application of spatial filtering, one may obtain a multitude of possible representations which either indicate acquisition or data processing issues or correlate with known geological or cultural features of the near-surface.

Some of the various data acquisition problems that can be identified by the error attribute include: (1) coupling problems, such as variation of sensor coupling with time; (2) additive noise (e.g., electrical noise) that shows up in a single sensor or otherwise locally within a spread; (3) ground roll that is not uniform within an analysis window for all traces of a common shot gather; and (4) excessive air blast noise that becomes visible only in some analysis gates. High values of the error attributes may indicate groups or even individual sensors with non-surface consistent noise. Dedicated hardware may receive the data, perform the data quality check using the present method, and output an alarm or other indication that a potential problem has been detected.

For data acquisition quality control, the surface consistent spectral analysis can be updated after a certain number of seismic shots have been recorded to monitor the performance of groups of seismic sensors or even individual sensors. In the extreme case, the surface consistent spectra can be updated after each shot. Performing the present method concurrently with data acquisition allows identification of acquisition-related problems that might otherwise go undiscovered for weeks, or even months. The method can also be used for data quality assurance in later stages of data processing. For example, the method can be performed subsequent to a data pre-conditioning process to alert the geophysicist or data processor of potential processing-related problems.

As stated above, the error attributes can be analyzed using a special processing module. This analysis module may perform the following exemplary operations, though other operations are also possible. A scalar value from a frequency range within the spectra may be extracted using a variety of norm functions. Typically a simulated power criterion is used as norm, but RMS, median, and extreme values can be used as well. One may also compute the difference of two frequency ranges, not necessarily from the same attribute or analysis window, either sample by sample (then extracting the scalar from the difference vector) or after extraction. This lends itself to relative analyses. Spatial filters (highpass or lowpass) may be applied to the fields of extracted scalar values. Under the assumption that geological features normally exhibit smooth variation in space, as opposed to acquisition related effects, the spatial filtering is useful to selectively enhance either of those in the displays. The output of this module can be processed by a multitude of programs that create color coded scatter maps or plots.

The regular spectra (optionally with spatial high pass filtering) show irregularly strong or weak stations, or indicate specific types of noise, if a characteristic frequency band is extracted or a difference of two such bands is displayed. There is also a strong correlation with the locations of roads and similar shallow underground structures.

Figure 1B:
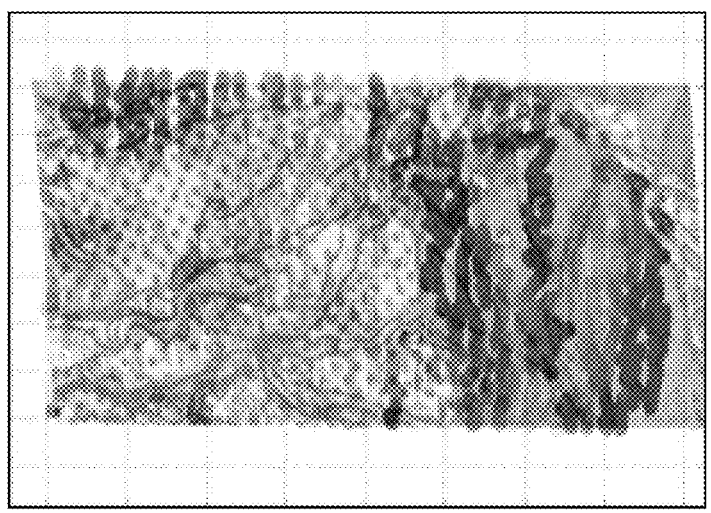
FIG. 1B is a superposition of the scatter plot of FIG. 1A and the geological map of FIG. 1C.
Figure 1C:
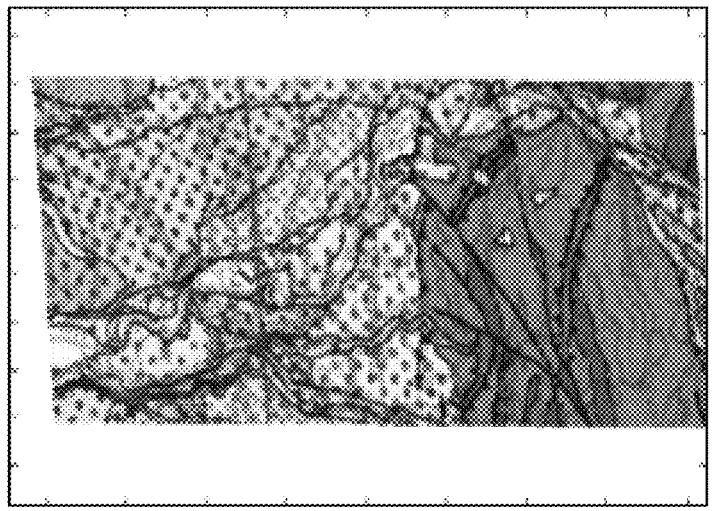
FIG. 1C is a geological map corresponding to the location where the data used to produce the scatter plot of FIG. 1A were obtained.

Another application is the integration of the frequency and error analysis with geographical information and satellite imaging. In examples studied, the low pass filtered displays of the overall power of all terms exhibit a very good correlation with the geology (including some deeper features), and the high pass versions of the detectors show strong correlations to cultural features such as roads. As an example we show in FIGS. 1A, 1B, and 1C a data acquisition quality control error attribute for the source signal strength (spatially low-pass filtered source power) superimposed on a geological map. This attribute shows the extent of source variation during the seismic survey. Specifically, FIG. 1A shows a scatter plot of an error attribute based on the source signal strength at various source locations, and FIG. 1C shows a geological map corresponding to the location where the data used to produce the scatter plot of FIG. 1A were obtained. FIG. 1B is a superposition of those figures, and shows a correlation between the error attribute and the geology.

FIG. 2 shows steps that are taken according to one embodiment of the present method. One begins by obtaining new or existing data having reflectivity information (200). A surface consistent decomposition on the data is performed (202). A decomposed logarithmic spectra from the surface consistent decomposition is computed (204), and one or more residua using the decomposed logarithmic spectra are computed (206). An error attribute is computed based on the one or more residua (208). The error attribute is output (210) and used as a quality control measure (212). The method can be used for both land and marine data.

While the invention has been described with respect to a limited number of embodiments, those skilled in the art, having benefit of this disclosure, will appreciate that other embodiments can be envisioned that do not depart from the scope of the invention as disclosed herein. Accordingly, the scope of the invention shall be limited only by the attached claims.

What is claimed is:

1. A method, comprising:
    obtaining data having normal incidence reflectivity information, the data being generated using one or more sources disposed on or near the earth's surface and one or more receivers disposed on or near the earth's surface;
    performing a surface consistent decomposition on the data using a processor;
    computing a decomposed logarithmic spectra from the surface consistent decomposition using the processor;
    computing one or more residua using the decomposed logarithmic spectra using the processor;
    defining one or more error attributes based on the one or more residua; and
    testing data quality using the one or more error attributes.

2. The method of claim 1, wherein the data is seismic data.

3. The method of claim 1, wherein the surface consistent decomposition comprises estimating source, receiver, common midpoint, and offset terms.

4. The method of claim 3, wherein the surface consistent decomposition further comprises estimating a global response term.

5. The method of claim 4, wherein the computing the decomposed logarithmic spectra includes computing a power spectrum of a data trace as a product of the power spectra of the source, receiver, common midpoint, offset, and global response terms.

6. The method of claim 5, wherein the one or more residua are the difference between the sum of the logarithms of the power spectrum of the source, receiver, common midpoint, offset, and global response terms and the logarithm of the power spectrum of the data trace.

7. The method of claim 1, wherein the one or more error attributes are based on source residua, receiver residua, common midpoint residua, offset residua, global response residua, or any combination of those.

8. The method of claim 1, further comprising plotting, displaying, or recording the one or more error attributes.

9. The method of claim 1, further comprising applying a spatial filter to the one or more error attributes.

10. The method of claim 1, wherein the one or more error attributes relate to a data acquisition issue.

11. The method of claim 1, wherein the one or more error attributes relate to a data processing issue.

12. The method of claim 10, wherein the data acquisition issue includes at least one of: a coupling problem, additive noise, non-uniform ground roll, and an excessive air blast.

13. The method of claim 10, wherein the one or more error attributes indicate individual receivers or groups of receivers having non-surface consistent noise.

14. The method of claim 1, wherein the one or more error attributes are determined using decomposed logarithmic spectra that are updated every shot or after a user-defined number of shots.

15. The method of claim 1, further comprising analyzing the one or more error attributes.

16. The method of claim 15, wherein the analyzing the one or more error attributes includes at least one of: extracting a scalar value from a frequency range within the spectra, computing a difference between two frequency ranges, extracting a characteristic frequency band, and computing the difference between two extracted characteristic frequency bands.

17. The method of claim 16, further comprising integrating frequency and/or error analysis with geographical information and/or satellite imaging.

18. The method of claim 15, wherein the analyzing the one or more error attributes includes extracting a scalar value from a frequency range within the spectra, and further comprising using a norm function to extract the scalar value.

19. The method of claim 18, wherein the norm function is one of: a simulated power criterion, a root-mean-square value, a median value, and an extreme value.

20. The method of claim 15, further comprising computing a difference between two frequency ranges and using the difference between the two frequency ranges to perform a relative analysis.

21. A method, comprising:
    obtaining seismic data, the data being generated using one or more sources disposed on or near the earth's surface and one or more receivers disposed on or near the earth's surface;
    performing a surface consistent decomposition on the data using a processor;
    computing a decomposed logarithmic spectra from the surface consistent decomposition using the processor;
    computing one or more residua using the decomposed logarithmic spectra using the processor;
    defining an error attribute based on the one or more residua;
    correlating the error attribute to a geological feature; and
    identifying the geological feature using the correlated error attribute.

22. The method of claim 21, further comprising analyzing the error attribute.

23. The method of claim 21, wherein the geological feature exhibits a smooth variation in space.

24. A method, comprising:
    obtaining seismic data, the data being generated using one or more sources disposed on or near the earth's surface and one or more receivers disposed on or near the earth's surface;

performing a surface consistent decomposition on the data using a processor;
computing a decomposed logarithmic spectra from the surface consistent decomposition using the processor;
computing one or more residua using the decomposed logarithmic spectra using the processor;
defining an error attribute based on the one or more residua;
correlating the error attribute to a cultural feature; and
identifying the cultural feature using the correlated error attribute.

25. The method of claim 24, further comprising analyzing the error attribute.

26. The method of claim 24, wherein the cultural feature comprises a road or a shallow underground structure.

27. A non-transitory computer-readable storage medium encoded with instructions that, when executed by a processor, perform a method, wherein the method comprises:
obtaining data having normal incidence reflectivity information, the data being generated using one or more sources disposed on or near the earth's surface and one or more receivers disposed on or near the earth's surface;
performing a surface consistent decomposition on the data;
computing a decomposed logarithmic spectra from the surface consistent decomposition;
computing one or more residua using the decomposed logarithmic spectra;
defining one or more error attributes based on the one or more residua; and
testing data quality using the one or more error attributes.

28. The method of claim 11, wherein the defining one or more error attributes is done subsequent to performing a data pre-conditioning process.

* * * * *